Feb. 16, 1954     E. O. LAWRENCE     2,669,675
DISPLAY SURFACE FOR COLOR TELEVISION TUBES
Filed Jan. 8, 1952                         2 Sheets-Sheet 1

INVENTOR.
ERNEST O. LAWRENCE
BY
ATTORNEYS.

Feb. 16, 1954  E. O. LAWRENCE  2,669,675
DISPLAY SURFACE FOR COLOR TELEVISION TUBES
Filed Jan. 8, 1952  2 Sheets-Sheet 2

INVENTOR.
ERNEST O. LAWRENCE
BY
Lippincott + Smith
ATTORNEYS.

UNITED STATES PATENT OFFICE 2,669,675

DISPLAY SURFACE FOR COLOR TELEVISION TUBES

Ernest O. Lawrence, Berkeley, Calif., assignor to Chromatic Television Laboratories, Inc., San Francisco, Calif., a corporation of California Application January 8, 1952, Serial No. 265,366

19 Claims. (Cl. 315—22)

This invention relates to cathode ray tubes for the display of polychrome television images directly upon the viewing surface of the tube. It is a modification and improvement on the cathode ray tubes for the same purpose disclosed in the co-pending applications of the same inventor, Serial Nos. 219,213 and 234,190.

In the copending applications mentioned there are disclosed tube structures employing display surfaces having viewing areas comprised of sub-areas coated with phosphors adapted to luminesce, respectively, in the different primary colors of an additive color system, the various sub-areas being, in one dimension at least, of less than elemental size, e. g., in a tricolor system three of such sub-areas, comprising one complete color cycle, would occupy, in one direction at least, a space of the same order of magnitude as the smallest detail which could be resolved by frequencies within the band available for the transmission of the television image. Spaced slightly from the display surface is a lens-grid structure composed of electrodes the separation of which is of the order of magnitude of a single such elementary area. An additional electron-permeable electrode is employed such that, when proper potentials are imposed between it and the lens-grid structure, electrons entering between an adjacent pair of electrodes of said structure are brought to a focus in the plane of the display screen in an area materially smaller than the width of the interstice between the adjacent electrodes, so that, if the beam be properly directed, only a desired one of the phosphor sub-areas will be excited at any one time. In the preferred forms of the invention, as described in either of the above identified copending applications, the electron permeable electrode takes the form of a thin film of metal, such as aluminum, deposited directly upon the surface of the phosphors. With this arrangement approximately one-quarter of the total potential between the electron emitting cathode of the tube and the display surface is imposed upon the electron-lens forming grid structure and the remaining three-quarters between the grid structure and the display surface. With this division of potentials the proper focusing action is obtained to bring the electrons entering any one of the elementary lenses to a focus within a dimension which is only a fraction of the separation of the electrodes themselves.

It is also shown in the copending applications mentioned that various means may be used for directing the electrons so as to cause the desired color to be displayed. Different potentials may be imposed between the electrodes forming the lens-grid, whereby a color-determining deflection is accomplished at the lens structure itself. Alternatively, the direction of approach of the electron beam may be altered so as to focus it upon the desired color or three separate beams may be used to converge upon the screen in slightly different direction, each focusing on one specific color phosphor.

The instant invention employs the same fundamental principles as those previously set forth. It differs, however, in the shape of the various phosphor sub-areas and in the precise form of the lens-grid and its disposition. Considered broadly, this invention involves the use of a display screen comprising spaced phosphor strips, luminescent in one primary color and extending entirely across one dimension of the display surface. In the spaces between these strips are intermediate strips which may be of substantially equal width to those first mentioned or may be wider. These intermediate strips comprise alternate quadrilateral areas, preferably rectangular, of the other two primary colors of the three color system. For many purposes it is immaterial which color is used for the continuous strips and which for the intermediate discontinuous strips comprise of alternate color blocks. Thus the continuous strips may be luminescent to produce green and the intermediate strips luminescent alternately in red and blue. For other purposes it is desirable that the continuous strips be blue and intermediate strips alternately red and green. The discontinuous strips are so positioned that the blocks of any one color are alined transversely to the length of the continuous strips.

The lens-grid structure is comprised of two sets of electrodes. The electrodes of one set are arranged to be substantially parallel to the continuous strips. Preferably adjacent electrodes of the set are mutually insulated and alternate electrodes connected, so that biasing and deflecting potentials can be imposed between each adjacent pair of electrodes. The second set has its elements arranged transversely to those of that first mentioned. It is possible so to arrange this second set of electrodes that it would effectively lie in the same plane as those of the first set; preferably, however, for ease of construction and insulation, and for better focusing, the second set is disposed in a plane slightly separated from the set first mentioned. The electrodes of the second set are arranged parallel to the direction of alinement of the color blocks of the discontinuous phosphor strips. The spacing of the electrodes of both sets should be not greater than the dimension of one elemental area or image point. Except for a possible slightly different spacing, the second set of electrodes may be a substantial duplicate of the first.

Any of the types of electron-permeable electrodes mentioned in the prior applications here referred to may be used to form the electron lenses, but, as in the previous applications above mentioned, the preferred type is a metal film deposited directly upon the phosphor coated surface, since such a coating forms a reflecting surface behind the luminescent layer which increases the visible light as well as serving as an element in the electron-lens system.

The separation of the electrodes of the lens-grid and the dimensions of the phosphor areas on the display surface are so proportioned, and the relative positions are such that when the proper focusing potentials are applied each individual mesh of the lens grid defines a corresponding area of the display surface within which all electrons entering that mesh from the electron beam are brought to a focus. Each such corresponding area is of like shape and has a similar phosphor pattern to the others, this pattern comprising a band of phosphor emissive of one color extending entirely across one side, the other side being equally divided between phosphors emissive of each of the other two primary colors. An electron whose path was the average of those entering the mesh would impact the display screen at the center of the corresponding area.

The display surface and grid structure thus described may be incorporated in tubes of various kinds. In certain applications a single gun tube may be used and the color displayed is controlled by deflecting potentials applied between the electrodes of the lens-grid structure. This is quite satisfactory for use with systems of the sequential type. With television systems of the simultaneous type a plurality of electron guns may preferably be employed, the colors displayed being dependent upon the gun or guns excited, and, hence, in which direction the electrons approach the display surface. In either event color balance may be secured by applying bias potentials between the electrodes of either or both sets.

As may be apparent from what has above been stated, pursuant to the primary purpose of the tube of producing electro-optical images in polychrome, the specific objects of the instant invention include the provision of a direct view color television tube structure which is applicable to any system of transmission, sequential or simultaneous; to provide a tube of the character described wherein the minimum dimensions of the individual phosphor areas may be at least fifty per cent larger than those employed in the previously described tubes utilizing the same broad principles, to provide a tube wherein the color balance of the images displayed may be adjusted at the will of the operator to produce the most pleasing effect, to provide a tube requiring lower potentials to effect color control; and to provide a tube which is mechanically feasible in construction and will give clear and accurate color images.

Other objects and advantages will become apparent hereinafter in connection with the description of certain details and embodiments of the invention which follow, taken in connection with the accompanying drawings wherein.

Figure 1:
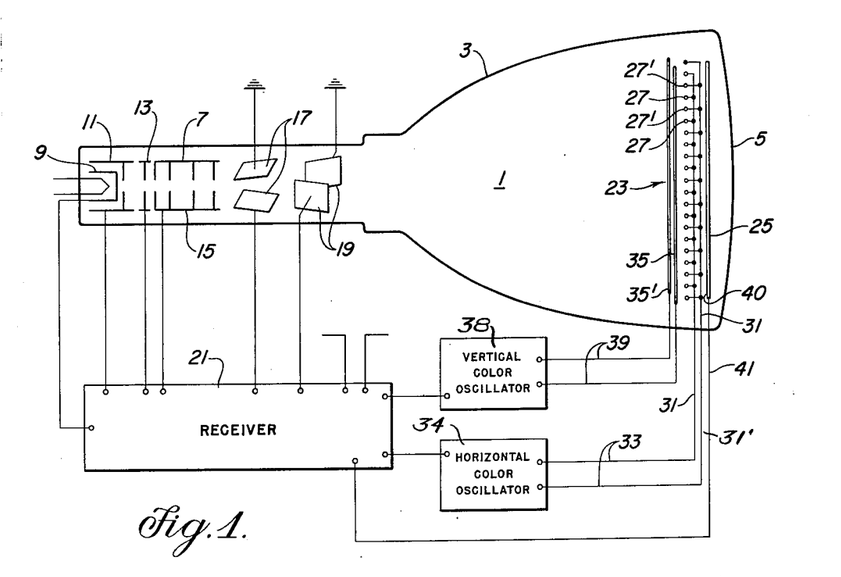
Fig. 1 is a diagram, partly schematic and partly in block form, showing a diagrammatic longitudinal section of a single-gun tube embodying the invention, together with its accompanying circuits.

In one preferred form of the invention it is embodied in a tube, basically of conventional form, which is indicated at 1 of Fig. 1. Such a tube comprises the usual evacuated envelope 3, which may be of all-glass construction or of metal and glass. It has the usual viewing window 5 at its enlarged end and an electron gun 7 in the neck. Such a gun may comprise an electron emitting cathode 9, control grid 11, first anode 13 and second anode 15. The tube as shown is provided with pairs of deflecting plates 17 and 19 for deflecting a beam of cathode rays, produced by the gun, vertically and horizontally respectively, but it is to be understood that the more usual deflecting coils may be used instead. However, electrostatic deflection is practical in a tube of this type because of the relatively low initial velocity of the electron beam, and as will be shown hereinafter it possesses definite advantages with respect to color control.

Potentials for focusing and deflecting the beam are supplied by a radio receiver symbolized by the block 21. No specific description of this receiver is believed necessary, since it is essentially conventional.

Figure 2:
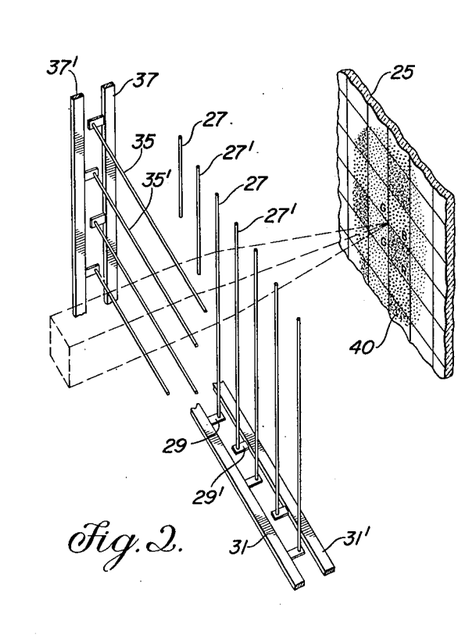
Fig. 2 is a fragmentary perspective view illustrating a portion of the display surface and portions of the two-lens-grid structures used in connection therewith.
Figure 3:
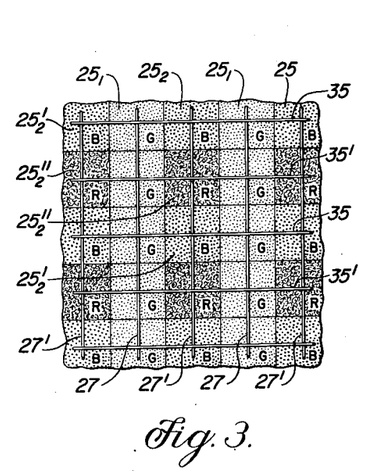
Fig. 3 is a fragmentary elevational view of the central portion of the display surface of the tube of Fig. 1 as it is viewed, through both lens-grid structures, from the direction of incidence of the electron beam.

The display surface or screen and electron-lens system indicated generally by the reference character 23 will best be understood by reference to Figs. 2 and 3. Fig. 3 shows the disposal of the collar areas upon the display surface 25. Basically, as this figure indicates, the three phosphors which contribute luminescence in the three primary colors of the additive system are disposed upon the base 25 in strips which extend completely across the display area in one dimension. Strips $25_1$ are continuous, consisting entirely of a phosphor luminescent in a single primary color. These strips are uniform in width and are parallel, spaced apart by a distance substantially equal to their own width in this particular screen, although, as will be shown hereinafter, this is not a necessary condition. Intermediate strips $25_2$ are discontinuous, comprising alternate blocks, $25_2'$ and $25_2''$, of the two remaining primary colors. The blocks $25_2'$ and $25_2''$, as here shown are square, and the junctions between the blocks are alined across the display surface so that the blocks in any one row, transverse to the direction of the continuous strips, are all of one color.

There is no fixed rule as to which color of luminescence is provided by the continuous strips and which by the discontinuous ones; in a field-sequential system there is a slight advantage in making the continuous strips luminescent in green and the discontinuous ones alternately red and blue. This may also hold true for line-sequential system. For certain dot-sequential systems or for the constant luminance system, both of which may be considered as at least quasi-simultaneous systems, there may be some advantage in making the continuous strips luminescent in blue, but the advantage to be gained by any arrangement is not of sufficient importance to destroy the utility of a screen of this character for use with any presently known system, even if designed primarily for a different one.

The embodiment of the invention shown in Fig. 1 may be considered, for the present purposes, as intended primarily for a field-sequential system and therefore strip $25_1$ has been indicated, by the letter G, as luminescent in green, with the blocks $25_2'$ luminescent in blue and blocks $25_2''$ in red.

Spaced from the plane of the display surface 25, by a distance short in comparison to the total length of the path of the electron beam, is a lens-grid structure which is comprised of two sets of linear electrodes, those in each set being parallel and substantially uniformly spaced. These electrodes are conveniently fine wires, although they may be narrow strips or tapes, mounted edge-on to the beam path. In the particular tube shown the first set of these electrodes, designated alternately as 27 and 27', are mounted parallel to the phosphor strips on the display surface. Electrodes 27 are connected through cantilever arms 29 to a common support beam or conductor 31; intermediate electrodes 27' are similarly connected through cantilever arms 29' to a common conductor 31'. It may be noted that the mode of support for electrodes 27 and 27' here shown is chosen primarily for simplicity of illustration and that in an actual tube it would probably be preferable to use a type of lens-grid structure such as is shown in the copending applications Serial Nos. 252,685 and 252,686 of E. O. Lawrence or in application Serial No. 252,664 of James T. Vale. Leads 33, connecting to conductors 31 and 31', are provided for applying proper potentials to the electrodes of the structure, as by the horizontal color oscillator 34.

A second substantially similar set of linear electrodes 35 and 35', similarly connected to supporting conductors 37 and 37', is mounted as closely as conveniently possible to the first set, between the latter and the electron gun. Leads 39 connect to these electrodes and are also brought out of the tube so that the necessary potentials can be applied thereto by a vertical color control oscillator 38. Owing to the difficulty of diagrammatic representation only two electrodes 35 and 35' of this second set are shown in Fig. 1.

An electron-permeable electrode, substantially coextensive with the display surface, is placed, with respect to the lens-grid structure, so that when proper relative potentials are applied to the elements of the system electrons from the beam passing through the lens-grid will be focused substantially on the display surface. As heretofore been shown, a preferable form for this electron permeable electrode is a film 40 of metal deposited directly over the phosphors of the display surface. Such a film is microscopic in thickness and serves the triple purpose of establishing the lens-forming electric field with the lens-grid structure, reflecting luminescence from the screen outwardly through the window 5, and suppressing secondary emission of electrons from the display surface. This film is not shown in either Figures 2 or 3 but is indicated by the reference character referred in Fig. 1 to the surface of the base 25 and the connection 41 for applying the focusing potential. Other possible dispositions of electron-permeable electrodes of other types for forming elemental lenses are disclosed in prior application Serial No. 219,213.

The width of the phosphor strips on the display surface should not be greater than the minimum elemental area or picture point which the tube, and the system in which it is employed, are intended to resolve. Fig. 3 shows the relative positions of the phosphor strips and the electrodes at the center of the screen. Viewed from this aspect it will be seen that electrodes 27 bisect the continuous strips $25_1$, while electrodes 27' similarly bisect the discontinuous strips $25_2$. Similarly the transverse electrodes 35 bisect the blocks $25_2'$ in the transverse direction while electrodes 35 bisect the remaining blocks $25_2''$. In this portion of the structure a pencil of electrons entering a mesh of the lens-grid, formed by an adjacent pair of electrodes of each of the two sets, if the potential of electrode 40 were the same as that on the lens-grid, would be distributed over an area of the display surface of which one-half would be a portion of a continuous strip 25 and the other half of which would be equally divided between portions of blocks $25_2'$ and $25_2''$; the resultant emission would be, in the case here considered, one half green and one quarter each red and blue.

As has been shown in the prior applications previously referred to, if a suitable potential is applied between the lens-grid structure and electrode 40 the electrons entering the mesh will be brought to a focus in the plane of the display surface and electrode 40. In this case an electron following a path which is the average of all of the electron paths in the beam would strike the display surface at a junction of the three different colored phosphors in the center of the quadrilateral area defined by the mesh.

Were the electrodes of the two sets conformed so that, to all intents and purposes, they lay on the same plane, aberrations would be introduced which would produce a focal spot of exaggerated pincushion or star shape. If, however, the two sets of electrodes are spaced slightly, a beam of circular cross section entering the mesh will give a nearly circular spot, or, alternatively, a beam filling the mesh will result in a focal spot substantially square.

In either case the statements above made with regard to the electron following the mean path impacting the triple junction between the three phosphors would still hold.

If, now, proper potential differences are applied between the electrodes of the two sets, the focal point will be shifted to a degree depending upon the magnitude of the potentials applied. Undeflected, the luminescence produced will be an unsaturated green. If electrodes 35 be made negative with respect to electrodes 35', the beam will be deflected toward the latter and the resultant color will be yellow; if a reverse potential is applied a blue-green will result. Making electrode 27 negative with respect to electrode 27' results in mixed red and blue, or purple luminescence, whereas an opposite deflection will give green.

Electrodes 27 and 35 both made negative with respect to the other electrodes in their respective sets will give red luminescence while electrodes 27' and 35' negative will give blue. Increasing deflection in any of the directions mentioned will give increased saturation of the hues produced, up to the point where the entire focal spot falls on an area emissive of a single color. If sinusoidal voltages are applied between the electrodes in each set, and these voltages displaced in phase by 90°, the focal point will be "spun" in a circular path, the radius of which will depend upon the amplitude of the voltages applied, and if the frequencies of the potentials causing the spinning are sufficiently high so that spot traverses all three colors within the period of the persistence of vision the psychological effect will be the same color as that produced by the undeflected image, in this case an unsaturated green, three-quarters of the energy being "white" and the remaining one-quarter green. Applying a fixed bias between conductors 27 and 27' the center of the circle about which the focal point is spun can be shifted so that the dwell of the spot on each of the three colors is equal, with a resultant pure white. By keying the beam in synchronism with the spinning of the focal spot any color may be produced.

It will be seen, therefore, that each mesh of the lens-grid defines an area of the display surface in which all electrons entering that mesh are brought to focus and that this area is so divided that one-half is luminescent in one primary color and one-quarter luminescent in each of the two others. In the center of the screen the area thus defined is very slightly larger in size than the lens-grid mesh and lies directly behind the latter as viewed from the electron gun. Because of the angles formed by the beam with the axis of the tube as its deflection increases, the correspondence in size between the meshes and the corresponding sub-areas of the screen is not exact nor do the display-screen areas lie directly behind the meshes which focus the electrons upon them except at the center of the screen. In spite of these facts it is quite simple to compute the relative position of any individual mesh and the center of the area of the display screen controlled thereby. The velocities of the electrons in the beam are proportional to the square roots of the potentials through which they have fallen. In order to scan any portion of the electron image the ratio between the transverse and longitudinal velocities of the electrons is known, this being the tangent of the angle of deflection. In the absence of deflecting potentials between the electrodes of the grid itself, an electron following the mean path of those entering a mesh—i. e., one passing through the center of the mesh—will retain its same transverse velocity in its passage between the lens-grid and the display surface. Their average longitudinal velocity between the lens-grid and the display surface is their velocity at the lens-grid plus one-half of the difference between that and their final velocity. The displacement of the point of impact of the mean-path electron from the base of a perpendicular dropped from center of the mesh to the display surface will therefore be defined by an angle whose tangent is the transverse velocity over the mean velocity between the lens-grid and the display surface; the distance between the plane of the lens-grid and the display surface being known, this defines the center of the area controlled by the individual mesh in question; the positions of the centers being defined and being also arranged in a regular quadrilateral array, this establishes the areas themselves.

Stated somewhat more concretely, the velocity of the electrons arriving at the lens-grid is determined solely by the difference of potential between the latter and the cathode. The longitudinal component of this velocity is proportional to the cosine and the transverse component proportional to the sine of the angle between the path of the electron and the perpendicular to the lens-grid at the lens-grid itself. The velocity of the mean-path electron as it reaches the display screen will again depend wholly upon the potential difference between the screen and the cathode but velocity will be added to the longitudinal component only; the transverse component will be unaffected.

Where the meshes of the lens-grid are small in comparison to its separation from the display screen the grid may be considered as a unipotential plane. In the tubes described herein the ratio of electrode separation to grid-screen spacing is of the order of 1:10, and no significant error is introduced by considering that the post-deflection acceleration starts at the plane of the lens-grid and is uniform in the space between it and the screen (although with closer spacing a slight correction might be warranted).

Near the edges of the screen a second order correction is preferably applied. Such a correction can be expressed in terms of the displacement, $d$, of the center of any screen sub-area, outwardly from a perpendicular dropped from the center of the corresponding mesh. This displacement can be expressed in terms of functions the angle $\theta$ and the relative velocities of the electrons at the grid and the screen respectively calling the potential of the lens-grid with respect to the cathode E and that of the screen with respect to the cathode E'. Electron velocity is proportional to the square root of the potential through which the electron has fallen; at the lens-grid the velocity $V = K\sqrt{E}$ where K is a constant of proportionality and at the screen the velocity $V'$.

The transverse component of velocity at the lens-grid is $$V_t = V \sin \theta = K\sqrt{E} \sin \theta$$

The longitudinal velocity is $$V_l = V \cos \theta = K\sqrt{E} \cos \theta$$

The transverse component is unchanged at the screen. The longitudinal component of velocity at the screen is the vector difference between $V_t$ and $V'$. Therefore $$V_l' = \sqrt{(V')^2 - V_t^2}$$

The average longitudinal velocity between lens-grid and screen is $$V_{av.} = \frac{V_l + V_l'}{2}$$

The ratio $V_t/V_{av.}$, times the distance D between the lengs-grid and screen gives the displacement $d$ for any angle $\theta$.

The displacement $d$ is therefore not a linear function of either $\theta$ or the linear deflection of the beam from the center of the screen. For deflections of up to about 30° uniform spacing of grid wires may be combined with uniform width strips without introducing significant error, however.

Thus with a 9" x 12" screen and a deflection, on the diagonal, of 30°, by proper choice of the various dimensions the maximum error in relative positions may be made less than two thousandths of an inch, at the corners of the screen, and less than one thousandth of an inch at any point along either axis of the screen. The over all dimensions of the lens-grid in this case are within 2% of those of the display screen; it is, therefore, "substantially coextensive" therewith.

If deflection angles greater than about 30° are to be employed, or if large spacings between lens-grid and screen are used, higher order corrections can be employed; for example, the phosphor strips can be made very slightly narrower at their ends than at their centers.

Electrodes 27, 27' are slightly closer to the screen than electrodes 35, 35'. The ratio of potentials for best focusing obviously cannot be maintained exactly for both sets, but small deviations from the theoretical optimum have but slight effect on the focus, and by making the potential of the set nearer the cathode slightly less and the more distant set slightly greater a compromise value is obtained giving highly satisfactory results. Small deviations from the theoretical ratio of potentials can, in fact, be used to make final adjustments in displacement, color balance or the like. The aberrations in the electron lenses are such that an ideal point focus will not be achieved in any case. With a focal spot of finite size some slight misplacement may be permitted as long as the positioning is substantially correct.

All of this explanation is given because, although for any given tube there is a perfectly definite and computable area of the display surface corresponding to each mesh of the lens-grid, each such area including each of the three color-emitting phosphors in the same proportions and in a pattern similar to those of every other area, the relative positions and sizes of the meshes with relation to the corresponding areas will vary with the mode of deflection, the type of electron lens, and the relative dimensions within the tube. The path of the "mean-path electron" through the center of any mesh, toward which other paths converge through the lens action of the arrangement, is parabolic. If one could view each area of the screen along the path of this electron, the screen area would appear to lie directly beneath the area of the corresponding mesh, as they do at the center of the screen, but there is no optical position from which all portions of the screen would so appear. Each area is, however, "electro-optically centered" beneath the corresponding mesh, and in this specification and claims this term is used to define the relationship.

By an extension of this same concept the electrodes 27, 27' of the lens-grid are also electro-optically centered over the strips 25, and 25₂ respectively, as are electrodes 35 and 35' over the color blocks 25₂' and 25₂''.

In the above discussion reference has been made to the plane of the lens-grid and since the latter is comprised of two sets of electrodes spaced differently with respect to the display surface the term may be somewhat indeterminate. No material error will be involved in considering the plane of the lens-grid to be that of the set of electrodes nearest the electron gun since the voltage gradient between this set and the display surface will be, on th average, uniform. If it prove desirable to make some departure from the theoretical ratio, some slight aberrations will be introduced but these will not be serious, first, because the position of the beam striking the display surface is dependent upon the electron velocities and these vary only as the square root of the potential involved, and, second, because the area defined by each mesh is so large in comparison with the size of the spot that there is ample latitude of movement for the latter to correct for minor deviation. Such movement can easily be achieved by varying the bias between the electrodes comprising either set.

It should be noted that the amount of bias that need be applied in order to effect a complete color change is materially less than that which is necessary when phosphors luminescent in all three of the primary colors are disposed in continuous strips, as disclosed in copending application Serial No. 219,213. In the latter case, when no color deflection is applied to the beam, it rests wholly upon a strip of one color and in order to obtain a complete change of hue must be moved a minimum distance of one-half the width of the strip plus one-half the diameter of the beam. With phosphors arranged as here described the minimum deflection required to effect excitation of a pure color is equal to one-half the diameter of the beam, added vectorily in two directions. Thus if the focal spot has a diameter of one-fifth of the width of the mesh, and (in a strip phosphor screen) each of the phosphor strips is one-third of the width of the spacing between electrodes, the spot would have to be shifted 0.266 times the electrode spacing width to effect a complete change of color. With the form of screen here shown the motion in the direction of the continuous strip necessary to effect such a change is only one-tenth of the electrode spacing. The voltage required to produce a given deflection, under the circumstances obtaining here, is directly proportional to the deflection. Under the assumptions here made only three-eighths as much voltage is required as in the case of the linear electrodes and since the reactive power necessary to charge the electrodes varies with the square of the voltage applied thereto, the power ratio would be a little over seven to one. To obtain a pure color from the discontinuous strips would require an equal deflection normal to that first mentioned, doubling the power requirement for this color change and thus reducing the apparent advantage over a continuous strip type of tube, but in spite of this only approximately three-tenths of the deflecting power is necessary as is required with the strip type previously disclosed. Power ratios will, of course, vary with systems; in field sequential system, where square waves are used and deflecting voltages are applied during only two-thirds of the color cycle, the power saving may be less than is the case in systems where an electron beam is spun at a high rate of sinusoidal voltages. It is also to be understood that the amount of saving will depend in part upon the diameter of the focused spot, becoming greater as the size of the spot is decreased.

Where this particular type of tube is to be used in connection with a dot-sequential system of television transmission, of the type wherein information as to color is modulated on a carrier in such manner that the phase of the resultant signal is representative of the hue and the amplitude of the intensity of the various component colors, the phases representative of the three primary colors being 120° apart, it is advantageous to make the transition between the respective primaries as abrupt as possible. Under these circumstances minimum color dilution is usually considered to be more important than economy in deflecting power, and the two 90° displaced sine waves used to spin in as large a circle as the area defined by each mesh will permit. If only the sine waves are applied between the adjacent electrodes of each set the dwell of the beam upon the continuous strip will be twice as long as its dwell on either of the other two. This can be corrected by imposing a bias potential between electrodes 27 and 27', which will shift the center around which the focal spot rotates far enough onto the discontinued strip $25_2$ so that only 120° of the arc rotation lie on the continuous strip. The exact amount of shift will depend on the size of the focal spot; the purest colors being obtained when junction between the continuous and discontinuous strips bisects the spot at the 120° points.

It is to be noted that the beam will be spun in opposite directions in passing through adjacent meshes of the lens-grid; thus, referring with the upper row of meshes in Fig. 3 and upon the assumption that the beam is being swept from right to left of the figure (which would be the usual left to right scanning as viewed through the window 5) if the beam is spun clockwise in the first mesh it would spin counter-clockwise in the second, clockwise in the third, counter-clockwise in the fourth and so forth.

A tube of this type used in the modified constant luminance system tentatively recommended by the National Television System Committee preferably has the continuous strips $25_1$ luminescent in blue and the discontinuous strips alternately in blocks of red and green. In this so-called N. T. S. C. system the vectors representative of red and green are 180° out of phase and the blue vector is at right angles thereto; the deflection system is therefore somewhat simplified if color selective potentials representative of red and green are applied between electrode 35 and 35'. This is a matter of convenience and not a necessity however.

Where the tube of Fig. 1 is used in connection with a field-sequential system the advantage of making the continuous strips luminescent in green arises from the fact that when the green field is being scanned the two sets of electrodes constituting the lens-grid mesh may be operated at the same potential. Under these circumstances, as has already been pointed out, transverse electrodes 35 and 35' are almost completely shielded and have substantially no focusing effect. The result is that in the vertical dimension the beam is unfocused by the lens-grid and if, in this dimension, one of the electrodes 35 or 35' should lie directly in the path of the beam it will not split the latter into two separate parts, falling on two different focal points, and therefore less "line structure" will appear on the screen when it is closely viewed. Since, when all three primary colors are present in the picture, most of the detail is carried by the green and the contribution of the red and blue is primarily to the chromaticity of the picture, the result is a more pleasing picture. As the blue primary contributes least to luminosity in the presentation of detail, when the other primaries are present, blue is the least advantageous color for the continuous strips in field-sequential systems. It must again be emphasized, however, that even though blue be used as the continuous strip primary in a field-sequential system, the disadvantage incurred thereby is not sufficient to prevent the presentation of a very satisfactory picture.

Figure 4:
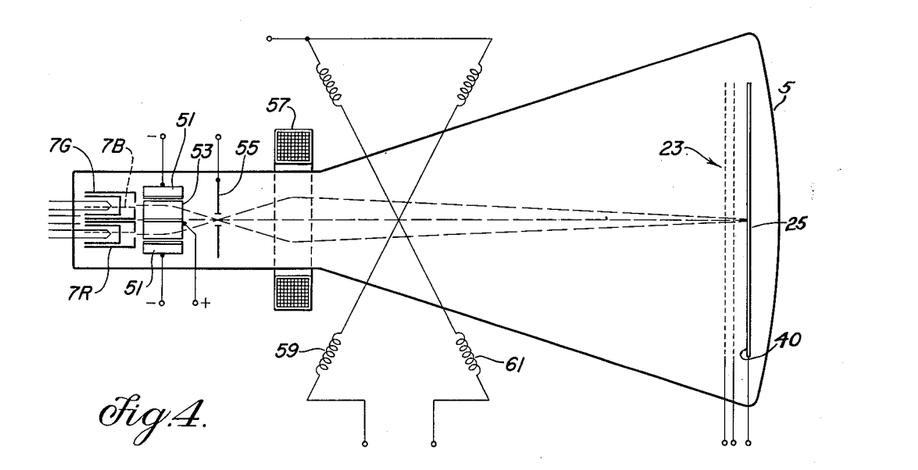
Fig. 4 is a diagrammatic section of a multi-gun tube embodying the invention.
Figures 5, 6:
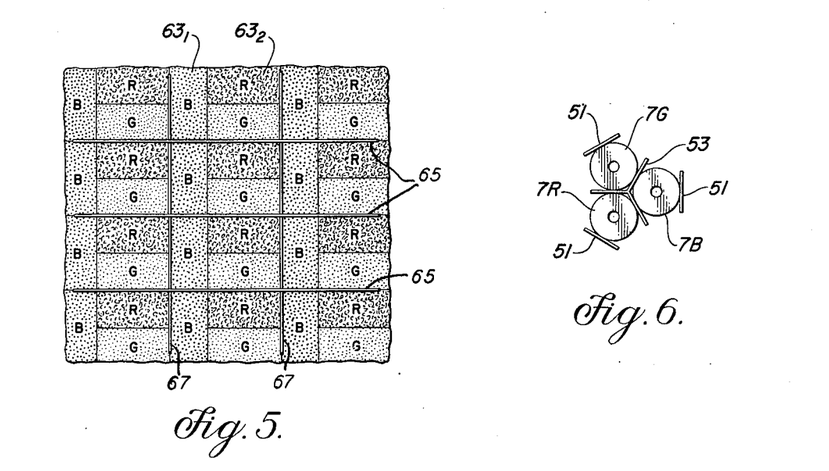
Fig. 5 is a diagram showing the relationship between the lens-grid electrodes and the phosphor areas of the display screen in a multi-gun tube.
Fig. 6 is a diagram showing the placement of the guns in a three-gun tube.

Another embodiment of the invention is illustrated in Figs. 4, 5 and 6. Fig. 4 is a diagrammatic illustration, generally similar in character to Fig. 1, showing the tube as a whole. Since, as far as this particular figure can show, the envelope, window, display surface and lens-grid are similar to those shown in Fig. 1, these parts are identified by the same reference characters. Differences between this and the first figure are those involved in the fact that in this embodiment three electron guns are used instead of one, these guns being designated respectively as 7G, 7R and 7B. Only two of these guns are fully shown in Fig. 4.

Deflecting plates 51 are mounted adjacent the end of each gun, to which there may be applied steady negative bias potentials, with respect to a central deflecting plate structure 53, so as to deflect the beams emitted from each gun through a collimating aperture in a diaphragm 55. This aperture therefore becomes the virtual source of electrons from all three guns. In operation the tube is provided with a focusing coil 57 which converges all three beams to a common area in the plane of the lens-grid structure 23, and, in this case, scanning deflection is accomplished magnetically by the usual coils 59 and 61.

In this embodiment of the invention the color displayed is determined, not by the relative potentials of the electrodes 27 and 27' or 35, 35' (the only function of these electrodes in this case being to focus the beam), but by the angle of incidence of the electrons with respect to the lens-grid. This latter is, of course, determined by which gun or which plurality of guns of the three-gun structure is emitting electrons at any given instant. In this form of the tube the phosphor pattern on the display surface is essentially the same as that shown in the first form described; it is formed of alternate continuous strips of one color phosphor and discontinuous strips of alternating blocks of phosphors emissive of the two other colors. Although the pattern itself is essentially the same as in the embodiment first described and the pattern electro-optically centered below any one mesh of the lens-grid is also essentially the same, considering the screen as a whole the lens-grid electrodes are electro-optically centered above alternate junctions between adjacent phosphor strips instead of above the center of each strip. As is the case in the first described embodiment, the electrodes of the lens-grid are separated by distances not greater than one picture element; it follows that with the same electrode spacing in the two forms of the device, the combined width of one pair of strips (one continuous and one discontinuous) will be one-half of the width of a similar pair of strips in the form first described. The height of each of the phosphor blocks in the discontinuous strips will also be substantially one-half of that in a similar block of the first described screen. Thus in this second embodiment the areas of the display surface controlled by each mesh are all substantially identical in pattern whereas in the form first described the areas controlled by any adjacent pair of meshes are mirror images of each other. Further, as shown in Fig. 5, the width of the continuous strips $63_1$ shown as luminescent in blue, is only one-half of the width of the discontinuous strips $63_2$, luminescent alternately in blocks of red and green. This results in equal areas of each phosphor, instead of twice as much of one as of the other two. A similar relative width of continuous and discontinuous strips is also quite possible with the double width strips used in connection with the tube of Fig. 1. There is no particular virtue, with a three gun tube, in the use of strips of different widths, since the guns are so arranged as to focus, in any event, on the phosphor luminescent in the proper color. Clearly from the point of view of manufacture it is somewhat easier to construct a viewing surface of equal width strips. On the other hand, if, in a single gun tube of the type shown in Fig. 1 the continuous strips be made of half the width of the discontinuous strip and the electron beam spun or rotated in a circle of the maximum diameter permitted by the spacing of the horizontal set of electrodes 65 (the spacing of the vertical set 67 being one and one-half times as great), the arcs of the beam over each of the phosphors will be substantially equal, and lower bias, if any, will be required between lens-grid electrodes to achieve a proper color balance, the size of the circle of rotation of the focal spot will be a maximum and the transition time between colors will be a minimum, and the area of each phosphor on the screen will be equal.

However, it is not necessary that either a one-to-one or a two-to-one ratio of strip width be adhered to. With a square mesh, instead of an oblong one as shown in Fig. 5, continuous strips substantially one-third the width of the discontinuous strips will also give equal arcs of each color, and closer spacing of picture points, at the expense of a somewhat more difficult screen to construct. It should be clear that the device would still be operative, particularly in the multigun form, at other ratios of strip width, were there any reason for using such other ratios.

In the multi-gun form of the device it is not necessary that adjacent electrodes of the sets forming the lens-grid be mutually insulated; since the color control in the scanning operation is achieved at the electron guns and not by the deflection in the lens-grid the electrodes of either set may all be operated at the same potential. In spite of this fact it is preferred that the electrodes of the respective sets be arranged so that a biasing potential can be applied between them. This permits a degree of control by the operator of the tubes with regard to color balance and also permits adjustments be made with regard to the position of the focal spot in order to correct inequalities or errors in the manufacture of the tube.

At the time of filing of this specification it is still uncertain what system of color television transmission will be finally standardized upon for use in the United States. It has already been indicated that certain of the features that have been described are more advantageous with one of the systems that has been proposed, others with another. Either of the forms that has been described in detail can be used with any of the transmission systems that have now received general publicity; moreover, other systems, not now generally known, may be proposed and may be ultimately adopted. Should alternative systems be permitted either of the two forms described in detail could be adapted for use in either system, although it should be obvious that it is more economical to use a tube of the single gun type in a purely sequential system such as the field-sequential system, whereas a high duty factor can be obtained with the quasi-simultaneous systems such as the constant luminance system through the use of multi-gun tubes. Furthermore, features which have been described in connection with either one of the two specific embodiments herein disclosed may be combined with other features taken from the other embodiment. As shown in copending application Serial No. 234,190, hereinabove referred to, the color display may be controlled by the angle of incidence of the beam to the lens-grid, instead of by deflection at the lens-grid itself, even with a single gun tube. It would further be possible to combine both forms of control in a single tube, using the lens-grid to deflect the electrons between the red and green blocks of the discontinuous strip and employing a separate gun for the blue signal; this even might have some advantages in connection with the constant luminance system.

For these reasons either form of the invention here disclosed can properly be designated as "preferred" over the other; both are illustrative of features and applications of the invention, which is itself considered to be as broad as is set forth in the following claims.

I claim:

1. In combination with a cathode ray tube comprising means for generating a narrow beam of electrons adapted for bi-dimensional deflection to scan a target area, a display surface for developing polychromatic electro-optical images in accordance with an additive system employing three primary color components comprising a base occupying said target area, a multiplicity of spaced phosphor strips of substantially uniform width deposited on said base and extending across said target area in one dimension, said strips being adapted to produce luminescence visible as one of said three primary colors when bombarded by said electron beam, and intermediate strips substantially filling the spaces between said first mentioned strips, said intermediate strips being comprised of alternate quadrilateral areas of phosphors luminescent upon electron impact to be visible in the two remaining primary colors of said additive system, and means adjacent to said target area for forming a multiplicity of elementary electron lenses adapted to focus said electron beam on said target area and including a lens-grid of quadrilateral meshes, each mesh being electro-optically centered over a sub-area of said target area including a portion of two only of said strips, the relative proportions of each of the three phosphors included within each such sub-area being substantially the same.

2. The combination set forth in claim 1 wherein said lens-grid comprises two mutually insulated sets of linear electrodes, the electrodes of one of said sets being mounted substantially parallel to said strips and the electrodes of the other of said sets being transverse to those of said first set, and electrical connections to each of said sets.

3. The combination set forth in claim 2 wherein adjacent electrodes of at least one of said sets are mutually insulated and alternate electrodes thereof are electrically connected.

4. The combination as set forth in claim 2 wherein said sets of electrodes are spaced at different distances from said target area.

5. The combination as set forth in claim 2 wherein the electrodes of one of said sets are electro-optically centered above the centers of said strips and the electrodes of the other of said sets are electro-optically centered above the centers of the areas of phosphors of said alternate strips.

6. The combination as set forth in claim 2 wherein the electrodes of said sets are electro-optically centered above alternate junctions between said strips and alternate junctions between the areas of different phosphors comprising alternate strips respectively.

7. The combination in accordance with claim 1 wherein said lens-grid comprises two sets of parallel wire electrodes disposed in substantially parallel planes, the spacing between said planes being less than the spacing between said display surface and the set of electrodes nearer thereto.

8. A target for a cathode ray tube for displaying tricolor television images according to an additive color system comprising a supporting base, a multiplicity of spaced phosphor strips of substantially uniform width deposited on said base and extending across said target area in one dimension, said strips being adapted to produce luminescence visible as one of said three primary colors when bombarded by said electron beam, and intermediate strips substantially filling the spaces between said first mentioned strips, said intermediate strips being comprised of alternate quadrilateral areas of phosphors luminescent upon electron impact to be visible in the two remaining primary colors of said additive system.

9. A target in accordance with claim 8 wherein said first mentioned phosphor strips and said alternate phosphor strips are of substantially the same width.

10. A target in accordance with claim 8 wherein the width of said alternate phosphor strips is substantially twice that of said first-mentioned strips.

11. In combination with a cathode ray tube comprising means for generating a narrow beam of electrons adapted for bi-dimensional deflection to scan a target area, a display surface for developing polychromatic electro-optical images in accordance with an additive system employing three primary color components comprising a base occupying said target area, a multiplicity of spaced phosphor strips of substantially uniform width deposited on said base and extending across said target area in one dimension, said strips being adapted to produce luminescence visible as one of said three primary colors when bombarded by said electron beam, and intermediate strips substantially filling the spaces between said first mentioned strips, said intermediate strips being comprised of alternate quadrilateral areas of phosphors luminescent upon electron impact to be visible in the two remaining primary colors of said additive system, and means for forming a multiplicity of electron lenses of elemental size comprising a first set of parallel wires disposed in a plane adjacent to said target area and parallel thereto, the wires of said first set being substantially parallel to said phosphor strips, a second set of parallel wires disposed in a second plane adjacent to both said target area and said first set of wires and substantially parallel thereto, the planes of said wires in the respective sets intersecting so that the two sets collectively comprise a meshed lens-grid the meshes whereof are electro-optically centered over substantially equal sub-areas of said display surface, said sub-areas each including the same relative proportions whereon are deposited phosphors luminescent in all three of said primary colors, an electron-permeable metallic film deposited over said phosphors, and separate connections to said wires and said film for applying different electrical potentials thereto.

12. The combination in accordance with claim 11 wherein said first set of wires is disposed between said second set of wires and said target area and more closely adjacent to said second set than said target area.

13. The combination in accordance with claim 11 wherein adjacent wires of at least one of said sets are mutually insulated and alternate wires thereof are electrically connected.

14. In combination with a cathode ray tube comprising means for generating a narrow beam of electrons adapted for bi-dimensional deflection to scan a target area, a display surface for developing polychromatic electro-optical images in accordance with an additive system employing three primary color components comprising a base occupying said target area, a multiplicity of spaced phosphor strips of substantially uniform width deposited on said base and extending across said target area in one dimension, said strips being adapted to produce luminescence visible as one of said three primary colors when bombarded by said electron beam, and intermediate strips substantially filling the spaces between said first mentioned strips, said intermediate strips being comprised of alternate quadrilateral areas of phosphors luminescent upon electron impact to be visible in the two remaining primary colors of said additive system, a first set of parallelly located and substantially uniformly separated conductors disposed in a plane adjacent to the target and substantially parallel thereto, the said conductors being located parallel to one edge of the phosphor strips and in the path of the developed electron beam and being of a cross-sectional area at any area of impingement of the developed electron beam such that the interception of the electron beam is of negligible amount, the said conductors being spaced from each other by distances of the order of one dimension of an image point to be resolved upon the target area, a second set of parallelly located and substantially uniformly separated conductors spaced from each other by approximately the spacing of the first set disposed in a secured place substantially parallel to each of the target and the first set of conductors and substantially adjacent to each and extending in a direction normal to the conductors of the first set so that the two conductor sets effectively comprise a mesh having its interstices centered over substantially equal sub-areas of the display surface, and means for applying electrical potentials to the sets of conductors to control under conditions of tube operation the point of its instantaneous electron beam impact on the target.

15. A combination claimed in claim 14 wherein alternate conductors of at least one of the sets are electrically insulated from the adjacent conductor in either side.

16. The combination claimed in claim 14 wherein the potentials applied to the sets of conductors establish a deflection of the developed electron beam passing between the conductor sets in approaching the target and the deflection is supplementary to the bi-dimensional deflection to scan the target area and is effective to alter the instantaneous point of electron beam impact on the target by positional changes of the order of a single image point shift.

17. In a cathode ray tube for developing electro-optical images in color as a result of impact upon a target area of electrons released from an emitting area within the tube envelope and directed to impact the tube target in substantially punctiform confinement and adapted to be caused to traverse the target bi-dimensionally, the combination comprising a first series of substantially parallel and uniformly spaced strip-like material coatings each of less than image point width and of like characteristic to transform the energy of impacting electrons into light observable in one of three component colors, a second series of alternating material coatings each of less than image point size filling the space between the first series of spaced strip-like material coatings, the coatings of the second series being of characteristics each to transform the energy of impacting electrons into light observable in a different one of the two other component colors, a multiplicity of conducting elements tautly supported in parallel relationship to each other and extending in a direction parallel to the edge of the first series of strip-like material coatings and spaced from one another at a maximum separation of the order of one dimension of an image point to be resolved on the target area, a second multiplicity of tautly supported parallelly positioned conducting elements spaced from one another by distances substantially coinciding with those of the first set and extending in a direction normal to the condutcors of the first set, all of the conductors being of such cross-section relative to the concentration of electron flow to the target that the electron interception is negligible, means for supporting the separate multiplicities of conducting elements parallel to each other and substantially parallel to the target and also substantially adjacent to each other and in close proximity to the target, and connections adapted to supply electrical potentials to the separate multiplicities of conducting elements relative to each other to impart to any flow of electrons through the interstices of the mesh-like configuration formed by the crossed multiplicities of conductors a deflection supplemental to that imparted to cause bi-dimensional target traversal such that the point of instantaneous electron impact may be shifted relative to the target by approximately one image point dimension.

18. The cathode ray tube claimed in claim 17 comprising, in addition, a metallic film formed substantially contiguous to the material coating the target and on the surface of the material toward the electron emitting area.

19. The cathode ray tube claimed in claim 18 comprising, in addition, means to maintain the metallic film positive relative to the electron emitting area, means also to maintain each of the conductor sets positive relative to the electron emitting area and at approximately one-fourth the potential difference between the metallic film and the electron emitting area whereby the electrons penetrating the interstices of the formed mesh-like configuration are adapted to be subjected to acceleration in the space between the mesh-like configuration and the metallic film and are adapted to be refocused to impact at the target plane instantaneously an area representing a fractional part only of the size of one image point to be resolved upon the target.

ERNEST O. LAWRENCE.

References Cited in the file of this patent

UNITED STATES PATENTS

| Number | Name | Date |
| --- | --- | --- |
| 2,446,440 | Swedlund | Aug. 3, 1948 |
| 2,446,791 | Schroeder | Aug. 10, 1948 |
| 2,532,511 | Okolicksanyi | Dec. 5, 1950 |
| 2,566,713 | Sworykin | Sept. 4, 1951 |
| 2,568,448 | Hansen | Sept. 18, 1951 |
| 2,577,368 | Schultz et al. | Dec. 4, 1951 |
| 2,581,487 | Jenny | Jan. 8, 1952 |
| 2,595,548 | Schroeder | May 6, 1952 |

FOREIGN PATENTS

| Number | Country | Date |
| --- | --- | --- |
| 866,065 | France | June 6, 1941 |
| 125,920 | Australia | Nov. 6, 1947 |